(12) United States Patent
Guild

(10) Patent No.: US 7,817,918 B2
(45) Date of Patent: Oct. 19, 2010

(54) PATH PROTECTION METHOD FOR A WDM NETWORK AND ACCORDING NODE

(75) Inventor: Kenneth Guild, Wivenhoe (GB)

(73) Assignee: Ericsson AB, Stockholm (SE)

( * ) Notice: Subject to any disclaimer, the term of this patent is extended or adjusted under 35 U.S.C. 154(b) by 166 days.

(21) Appl. No.: 10/521,339

(22) PCT Filed: Jul. 10, 2003

(86) PCT No.: PCT/GB03/02984

§ 371 (c)(1),
(2), (4) Date: Aug. 12, 2005

(87) PCT Pub. No.: WO2004/008800

PCT Pub. Date: Jan. 22, 2004

(65) Prior Publication Data

US 2006/0127088 A1      Jun. 15, 2006

(30) Foreign Application Priority Data

Jul. 10, 2003    (DE)    .............................. 102 31 275

(51) Int. Cl.
*H04B 10/00* (2006.01)
(52) U.S. Cl. .............................. 398/50; 398/45; 398/59
(58) Field of Classification Search .............. 398/45–57
See application file for complete search history.

(56) References Cited

U.S. PATENT DOCUMENTS

| | | |
|---|---|---|
| 6,023,359 A | 2/2000 | Asahi |
| 6,072,610 A | 6/2000 | Kuroyanagi et al. |
| 6,579,018 B1 * | 6/2003 | Li et al. ........................... 398/4 |
| 7,212,739 B2 * | 5/2007 | Graves et al. ................... 398/5 |
| 2006/0153563 A1 * | 7/2006 | Feuer et al. ..................... 398/45 |

FOREIGN PATENT DOCUMENTS

| | | |
|---|---|---|
| GB | 2 350 001 A | 11/2000 |
| WO | WO 01/45451 A1 | 6/2001 |
| WO | WO 01/74111 A1 | 10/2001 |

OTHER PUBLICATIONS

Nagatsu, N., et al., *Architectural Analysis of Multiple Fiber Ring Networks Employing Optical Paths*, Journal of Lightwave Technology, IEEE., New York, US, vol. 15, No. 10, Oct. 1, 1997, pp. 1794-1804.

Sabella, R., et al., *Impact of Transmission Performance on Path Routing in All-Optical Transport Networks*, Journal of Lightwave Technology, IEEE, New York, US., vol. 16, No. 11, Nov. 1998, pp. 1965-1971.

* cited by examiner

*Primary Examiner*—Agustin Bello
(74) *Attorney, Agent, or Firm*—Kirschstein, et al.

(57) ABSTRACT

In a wavelength division multiplex (WDM) optical communications network having a plurality of nodes, each of which comprises a wavelength selective optical cross-connect having a plurality of switching matrices, each switching matrix being provided for switching wavelength channels of a specific wavelength, a method of transmitting information from a start node to a target node includes the steps of applying to respective inputs of switching matrices of the start cross-connect, at least two wavelength channels (working an protection channels) having different wavelengths but which are modulated with the same information; transmitting the working and protection channels to the target cross-connect; and dropping the working and protection channels at outputs of different switching matrices provided for different wavelengths of the target cross-connect.

4 Claims, 4 Drawing Sheets

PATH PROTECTION METHOD FOR A WDM NETWORK AND ACCORDING NODE

The present invention relates to the field of transmission in wavelength division multiplex (WDM) optical communications network. More specifically, it relates to a method for protected transmission of information in a WDM optical network having several nodes and to a node suitable for carrying out such a method.

Wavelength division multiplex optical communications network generally comprise a plurality of nodes which are interconnected by optical fibre lines in accordance with a network configuration. The optical fibres lines interconnecting the nodes are connected to what are often termed trunk ports of the nodes and are capable of transporting (guiding) a plurality of information bearing optical radiation components having a respective carrier wavelength. The modulated optical carriers are often termed wavelength channels. The wavelength channels transmitted simultaneously over the optical fibre lines may originate from different transmitters and/or be destined for different receivers connected to one of the nodes in the network.

Optical fibres lines that connect a transmitter/receiver directly to a node are here referred to as add/drop lines and are connected to tributary ports of the node, to differentiate them from the optical fibre lines interconnecting nodes.

In order to convey the wavelength channels correctly from transmitter to receiver within the network, cross-connects, i.e. switching stations, are provided at the nodes of the network. Cross-connects have several input and output ports, termed trunk ports, for connecting to the optical fibres interconnecting the nodes which are capable of separating (de-multiplexing) wavelength division multiplex (WDM) optical radiation arriving at one of its input ports into individual wavelength channels, determining for each wavelength channel at which of the several output ports of the cross-connect it must be output, and to output, at each output port, the wavelength channels reassembled into WDM. For this purpose, it is known for so-called wavelength selective optical cross-connects to comprise, at each of its input trunk ports, an input de-multiplexer which separates the WDM radiation into separate wavelength channels, an optical switching fabric for each wavelength channel which receives from each input de-multiplexer the wavelength channels assigned to the switching fabric, and corresponding to each output trunk port, an output multiplexer which reassembles the separate wavelength channels cross-connected by the switching fabrics into a wavelength division multiplex for further transmission.

In order to provide protection and make the transmission in such a network as fail-safe as possible, failure-prone components of the network are duplicated, wherever possible to provide some redundancy.

Figure 1:
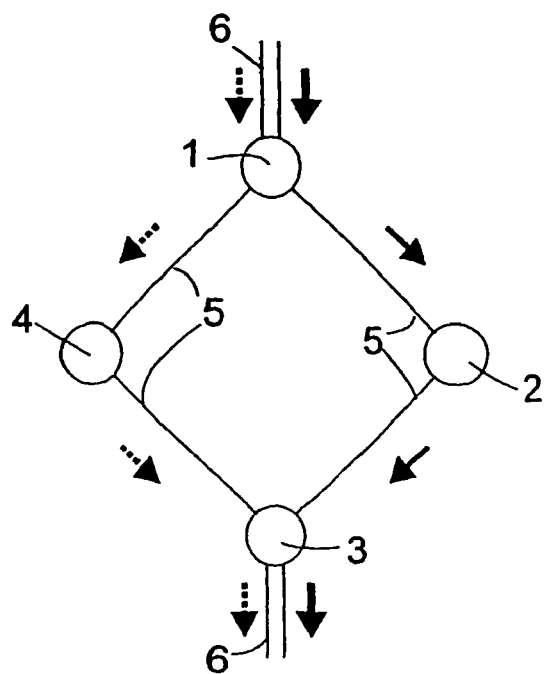

One possibility of providing protection is schematically shown in FIG. 1. The Figure shows in a highly simplified manner a WDM optical transmission network having nodes 1, 2, 3, 4 connected by optical fibre lines 5. A wavelength channel to be transmitted is fed twice via an add line 6 at starting node 1, once as a so-called working channel, represented as a full-line arrow, and once as a so-called protection channel, represented as a dashed arrow. The starting node 1 conveys the working and protection channels to the target (destination) node 3 on different paths, the working channel via node 2 and the protection channel via node 4. If a failure occurs at node 2 or the optical fibre lines connecting this node with nodes 1 or 3, and the working channel thus does not arrive correctly at target node 3, the protection channel can be used instead. Accordingly, if it is found out at the node 3 or at a receiver (not shown) connected to the node 3 that the working channel is defective or absent, it is possible to switch over to reception of the protection channel with little delay.

Failures at the start or target nodes 1, 3 themselves may affect working and protection channels simultaneously. Such a failure cannot be remedied in the way described above.

In order to make the start and target nodes fail-safe, too, it is current practice in electrical cross-connects to install a working switching fabric and an additional redundant protection switching fabric which respectively convey the working and protection channels. Thus, in the case of a failure of the working switching fabric, the protection switching fabric may assume its function.

Figure 2:
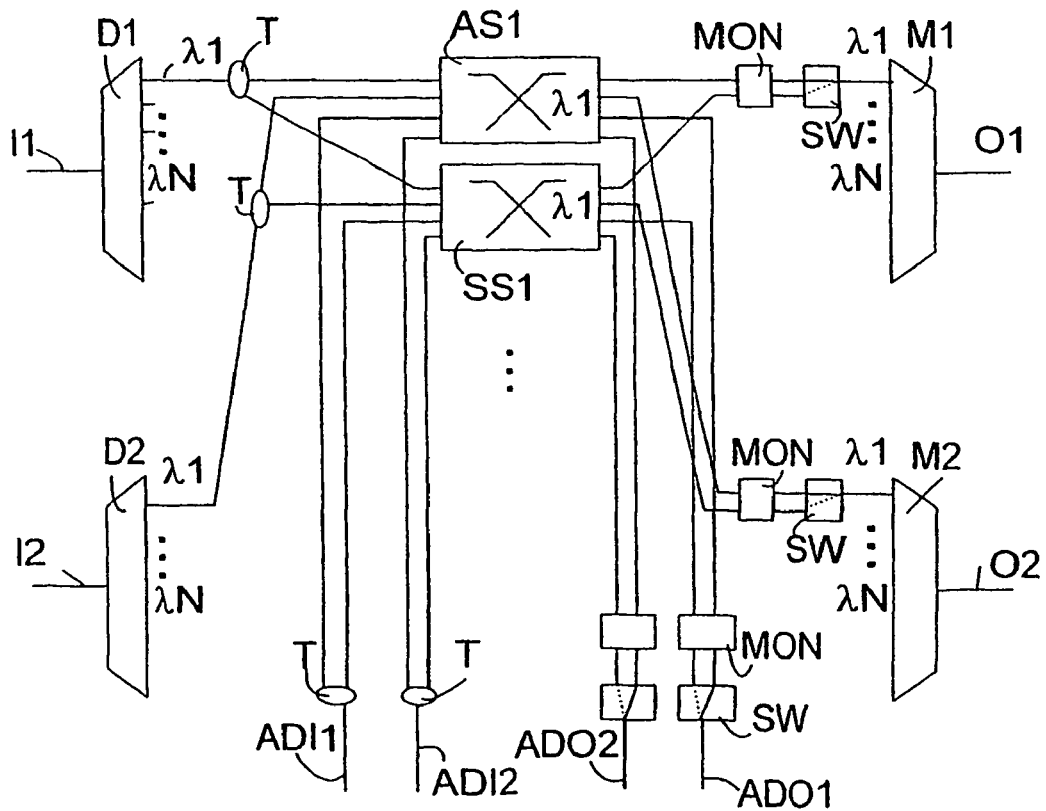

FIG. 2 shows the application of this principle to a wavelength selective optical cross-connect. The cross-connect, which is typically a part of a node such as 1 or 3 in FIG. 1, has a plurality of input ports (two input ports I1, I2 are shown) for receiving WDM radiation via one optical fibre line from another node and a corresponding plurality of output ports O1, O2 for transmitting WDM radiation to the other nodes. At each input port I1, I2, a de-multiplexer D1, D2 having N outputs is connected, N corresponding to the number of wavelengths $\lambda 1$ to $\lambda N$ of the WDM radiation. Each of these wavelength channels $\lambda 1$ to $\lambda N$ has a respective working optical switching fabric and a protection optical switching fabric assigned to it. Only the switching fabrics AS1 and SS2 assigned to the wavelength $\lambda 1$ are shown in FIG. 2.

At each output of the de-multiplexer D1, D2, a power divider T is connected which distributes the wavelength channel from said output to an input of the working switching fabric AS1 and an input of the protection switching fabric SS1. Wavelength channels added locally at add line input connectors ADI1, ADI2 of the cross-connect are also distributed to both switching fabrics AS1, SS1 by power dividers T. The outputs of working and protection switching fabrics AS1, SS1 are each connected pair-wise to monitors MON and, via these, to high reliability optical switches SW. The monitors MON are for monitoring the wavelength channels from the working switching fabric AS1 and the protection switching fabric SS1, respectively. If the monitor detects no failure, each monitor MON controls the assigned switch SW such that it transmits the working channel coming from the working switching fabric AS1. If the monitor recognizes a failure of the working channel, it controls the switch SW such that the protection channel coming from the protection switching fabric is transmitted. A first group of the switches SW is connected to inputs of multiplexers M1, M2 that combine the wavelength channels arriving at the inputs into a wavelength multiplex and output it at output port O1, O2 of the cross-connect. A second group of switches SW is connected to drop connectors, i.e. to output connectors ADO1, ADO2 for drop lines. These enable selected wavelength channels to be dropped by the cross-connect to the drop lines.

The protection switching fabric SS1 guarantees that even in the case of a failure of the working switching fabric AS1, wavelength channels can be cross-connected, added and/or dropped at add/drop line connectors of the cross-connect.

This solution is has two principle drawbacks. Firstly, optical switching fabrics are rather expensive since in an optical cross-connect, the proportion of the overall cost of the device corresponding to the switching fabrics is much higher than in an electrical cross-connect. Secondly, the power dividers produce insertion losses requiring that in a transmission network using cross-connects of the type shown in FIG. 2, the transmitted wavelength channels to be re-amplified more frequently than in a network with cross-connects that do not contain redundant switching fabrics.

The present invention arose in an endeavour to provide a method for transmitting information in a WDM optical communications network and a node for such a network that achieve a high degree of fail-safety or protection at a lower cost than the known solutions and with a low insertion loss.

In a wavelength division multiplex optical communications network having a plurality of nodes, each of which comprises a wavelength selective optical cross-connect having a plurality of switching fabrics and in which each switching fabric is provided for switching wavelength channels of a specific wavelength, a method for transmitting information from a start node to a target node comprising: applying to an input of switching fabrics provided for said wavelength of the cross-connect of the start node at least two wavelength channels having different wavelengths but which are modulated with the same information; transmitting the wavelength channels to the cross-connect of the target node via a connection between the nodes; and extracting the wavelength channels at outputs of different switching fabrics provided for different wavelengths of the cross-connect of the target node.

The method of the invention achieves an effective redundancy of the optical switching fabrics at the cross-connects of start and target nodes not by expensively duplicating the switching fabrics themselves but by wavelength diversity between the two wavelength channels having identical information content, i.e. the working and protection channels. By adding these at the start cross-connect with different wavelengths, it is ensured that they will be conveyed by physically different switching fabrics, so that the failure of a single switching fabric will not cause interruption of both channels.

A similar reasoning applies for the target cross-connect. By having working and protection channels arriving here with different wavelengths, it is guaranteed that they will be conveyed by different switching fabrics, so that here, too, the failure of a single switching fabric will not block the information flow.

As far as the information thru-traffic at a node is concerned, i.e. those wavelength channels that arrive at the concerned node from a second node and are further conveyed to a third node, no problems are caused. If it is assumed that a pair of working and protection channels having identical information content are conveyed via the same node, the signals will transit different switching fabrics due to the different wavelengths. Preferably, care will be taken to ensure that working and protection channels are conveyed on different paths between start and target nodes, since only in this way a serious failure such as a line interruption between two nodes can be compensated.

In a simple embodiment, the working and protection channels maintain their wavelengths during transmission from start to target nodes. This simplifies control of the potentially large number of wavelength channels which may be transmitted simultaneously in a WDM optical transmission network, but it has the disadvantage that there is a possibility that it will be not be possible to convey the working or protection channel because at one of the nodes it transits on its way from transmission to receiver, there is no wavelength channel leading to the subsequent node available that has the required wavelength.

In order to avoid this problem, it is desirable to be able to change the wavelength of a wavelength channel upon transit through a node, in order to be able to convey it on a line leading to the subsequent node of its path with an arbitrary wavelength that happens to be available on that line.

If such a modification of the wavelength is carried out by the individual nodes of the network autonomously on each of the wavelength channels transiting them, only according to the aspect of availability of wavelength channels on the line to the desired subsequent node, it may happen that working and protection channels arrive at the target node with identical wavelengths. This would cause the two channels to be switched by the same switching fabric assigned to that wavelength at the target node. In that case, there would be no redundancy of the switching fabric at the target cross-connect. This danger can be regarded as tolerable because the probability of working and switching channels arriving with identical wavelengths equals 1/N, N being the number of wavelengths that can be transmitted in multiplex in the network.

In order to exclude completely the danger of working and protection channels arriving with identical wavelengths at the target node, several solutions are provided. The simplest is to divide the N wavelengths that can be transmitted in the network into several groups—two groups if one protection channel is transmitted for each working channel, three or more groups, if two or more protection channels are transmitted, wherein each wavelength may only be assigned to one group, and to select the wavelength of the working and protection channels supplied to the inputs of the start cross-connect from different ones of these groups. In a subsequent wavelength change at an intermediate node, any change is permitted between two wavelengths that belong to a same group. In this way, it is ensured that the wavelengths of working and protection channels will always be different without requiring a coordination between the individual nodes concerning the wavelengths to be used.

Another possibility of avoiding working and protection channels at the target node having the same wavelength is where the network has a centralised network management system which has a global network knowledge of the wavelength channels used at each node. If the central network management system is used for defining the routes of working and protection channels, it is possible to ensure that on the last section of their path, between the last intermediate cross-connect and the target cross-connect, working and protection channels will be transmitted with different wavelengths, whereas on all preceding sections, the transmission wavelengths of the channels may be selected from all wavelengths without consideration of the wavelength of the respective other channel.

According to a second aspect of the invention there is provided a node for an optical network having a wavelength selective optical cross-connect comprising a plurality of connectors for optical wavelength multiplex connections and a plurality of switching fabrics, each of which is provided for switching optical radiation of a specific wavelength and having a plurality of connectors for adding data traffic, the node being characterized by a signal divider for dividing an add information signal to at least two add data traffic input connectors of switching fabrics assigned to different wavelengths. This node may be supplied with the add wavelength channel in non-redundant form; the splitting into working and protection channels having different wavelengths being carried out in the node itself.

Complementarily, a node suitable as a target node is characterized by a selector for selecting a drop wavelength channel to be dropped at the node among output connectors for dropping data traffic of switching fabrics provided for different wavelengths of the node.

Signal dividers and selectors of this node may be of optical or electrical type.

Figure 3:
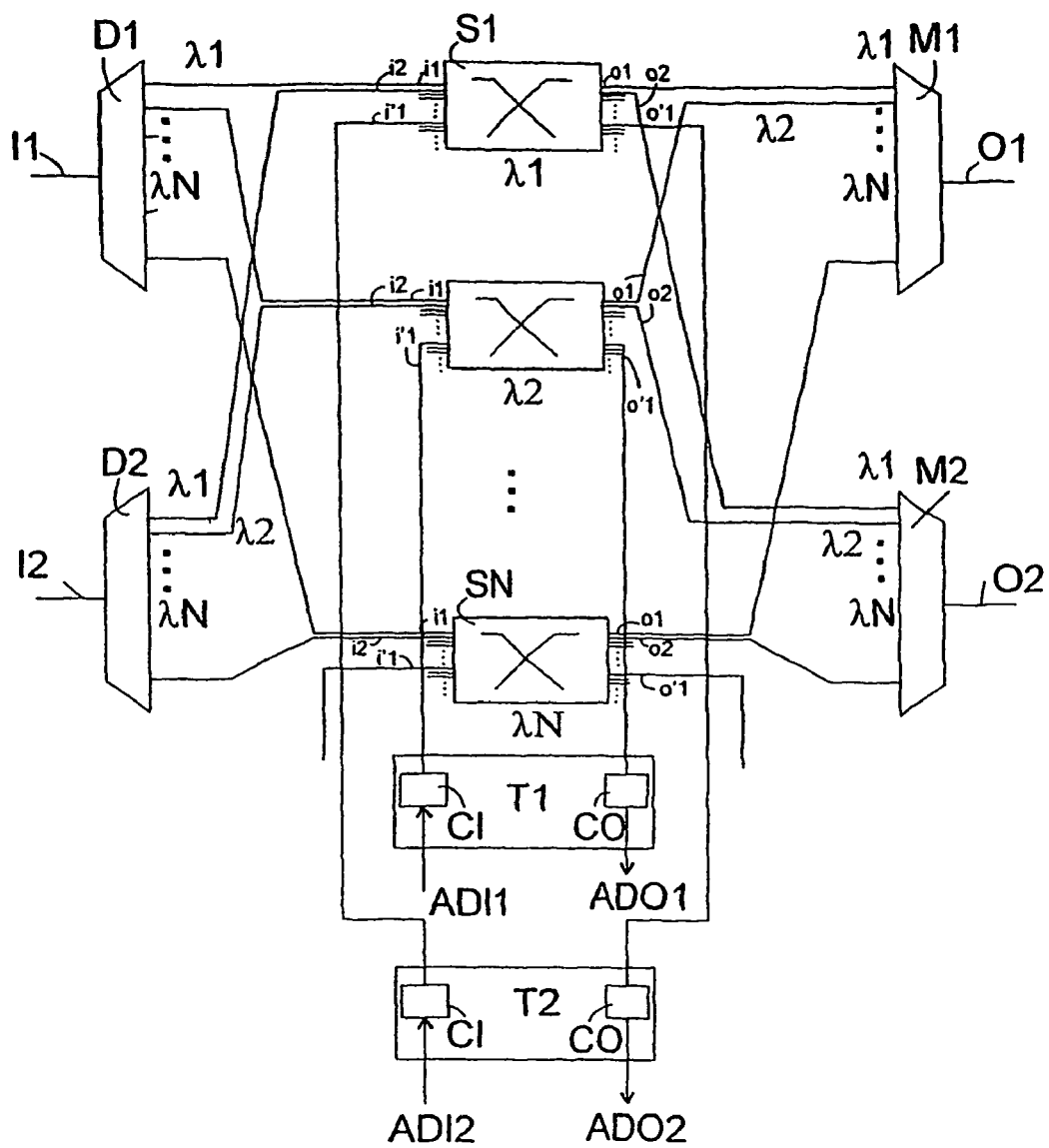
Figure 4:
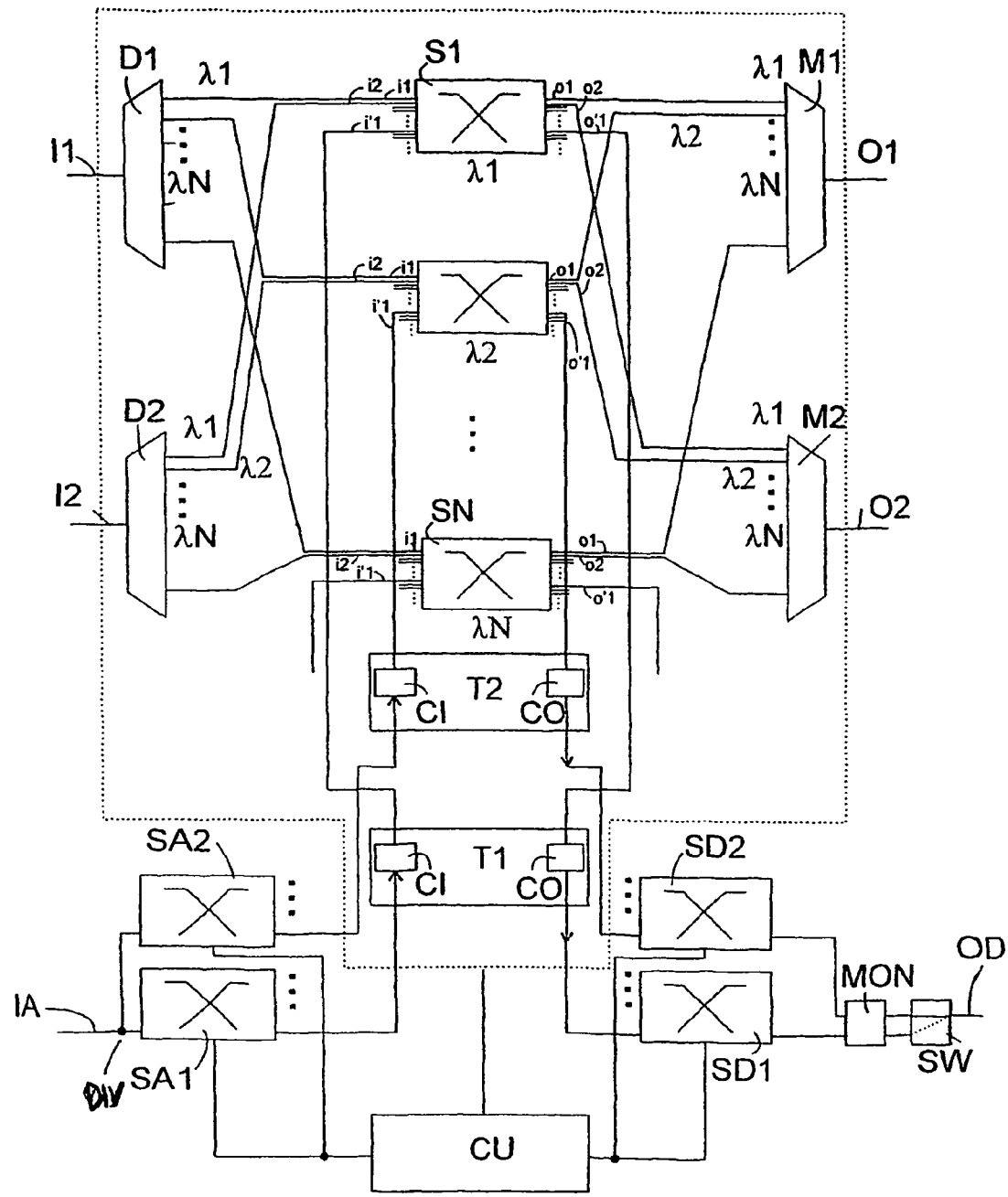
Figure 5:
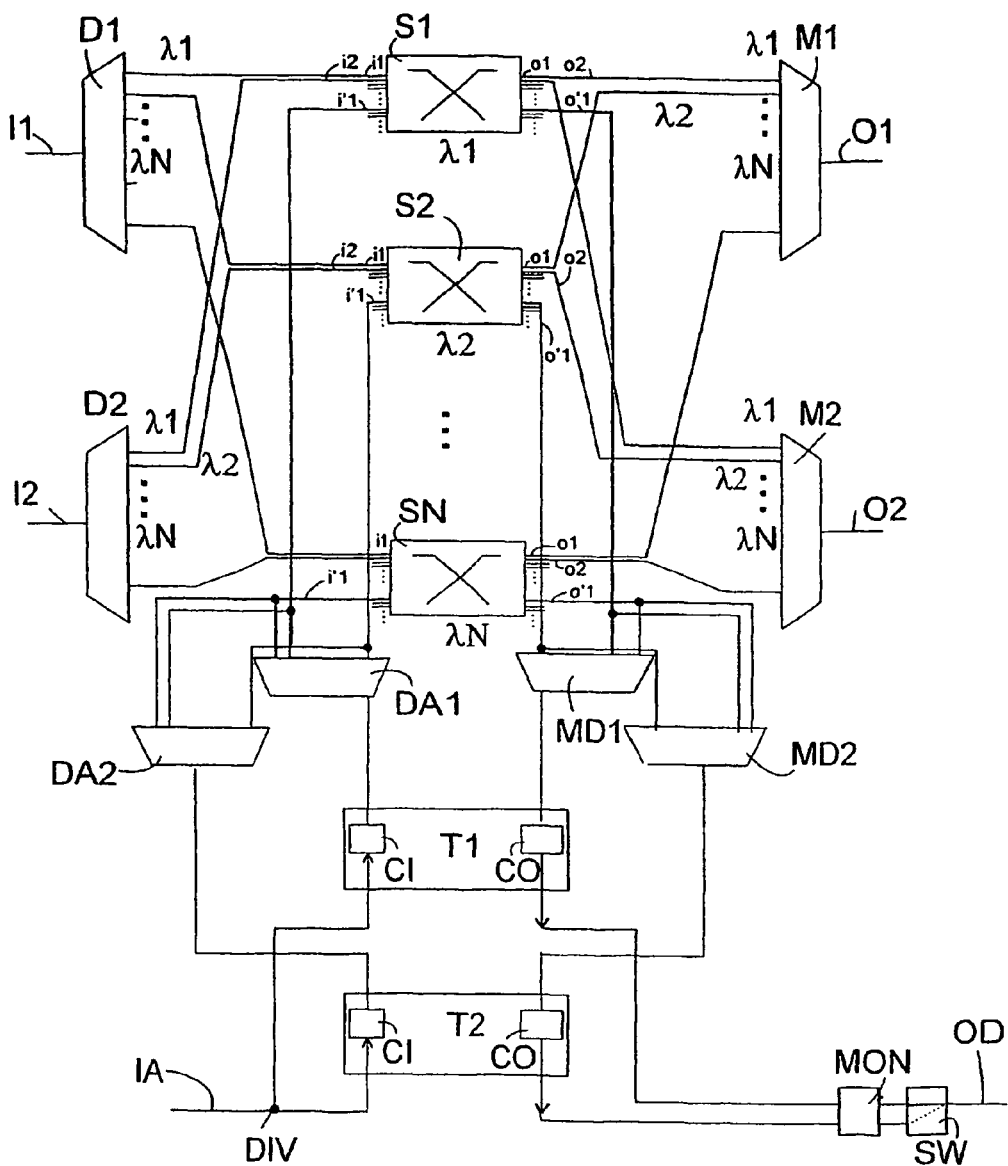

Embodiments of the invention will now be described by way of example only with reference to accompanying drawings in which:

FIG. 1, already discussed, is a schematic representation of an optical transmission network;

FIG. 2, already discussed, is an example of an optical cross-connect having duplicated optical switching fabrics;

FIG. 3 represents a wavelength selective optical cross-connect for use in the transmission method of the invention; and FIGS. 4 and 5 represent nodes of a WDM optical network according to the invention.

FIGS. 1 and 2 have already been discussed above.

An optical network in which the present invention is applicable may for example have the topology shown schematically in FIG. 1.

The nodes of the network each comprise an optical cross-connect having the structure shown in FIG. 3. Since this structure is substantially the same as that of the cross-connect shown in FIG. 2, only the differences between the two shall be discussed in the following.

The de-multiplexers D1, D2 and multiplexers M1, M2 are not different from those of the cross-connect from FIG. 2; corresponding to the number of input and output connectors I1, I2, O1, O2 of the cross-connect that can be connected with optical fibre lines to interconnect the node to other nodes of the network, a larger number of them may be present than shown in the Figure.

Each output of the de-multiplexers D1, D2 is connected directly to a first group of inputs i1, i2, ... of switching fabrics S1, S2, ..., SN, each of which processes one of the wavelengths λ1 to λN of the wavelength multiplex transmitted in the network. Accordingly, a first group of outputs o1, o2, ... of the switching fabrics is connected to inputs of the multiplexers M1, M2. Since the wavelength channels do not transit power dividers between the de-multiplexers D1, D2 and the switching fabrics, they reach the multiplexers M1, M2 and, finally, the output connectors O1, O2 with low power losses. A wavelength channel may therefore transit the cross-connects of several subsequent nodes without re-amplification becoming necessary.

The switching fabrics S1, S2 to SN further have a second group of inputs i'1, ... and o'1, ... for respectively adding and dropping data traffic, each of which is connected to a transponder. In the Figure two such transponders T1, T2 connected to the switching fabrics S1, S2 are shown, but it is apparent that each switching fabric may have several add inputs and drop outputs i'1, ... and o'1, ... having a transponder connected to each of these. Simplistically, each transponder may be regarded as pair of converters CI, CO, the input or add signal converter CI being connected to an input connector ADI1, ADI2, ... for an add line in order to convert an information signal of arbitrary type, electrical or optical, coming from a transmitter into an optical signal having the wavelength corresponding to the switching fabric to which the transponder is connected. The output or drop signal converter CO connected to an output connector ADO1, ADO2 for a drop line carries out an inverse conversion.

The add signal converters CI may be monochromatic, i.e. suitable for generating an optical signal having a fixed carrier wavelength, or polychromatic, i.e. suitable for generating signals having one of several different carrier wavelengths.

FIG. 4 shows a node having a cross-connect according to FIG. 3, in which the input signal converters CI of the transponders T1, T2, ... are monochromatic. In the Figure, the cross-connect is surrounded by a dashed frame. The node has plurality of add inputs IA for adding an information. This signal may be optical or electrical. In the Figure, for the sake of clearness, only one such add input IA is represented. This input IA is connected to two inputs of add switching fabrics SA1, SA2 via a signal divider DIV. In case of an electrical signal, the signal divider is a simple line implementation, in the case of an optical signal it is a power divider supplying one half of the power of the incoming signal to each of the two switching fabrics.

Each of these add switching fabrics SA1, SA2 has a group of wavelengths of the multiplex assigned to it, e.g. it may be assumed that the switching fabric SA1 has the wavelengths λ1, λ3, ... with an odd-numbered index and the switching fabric SA2 has the wavelengths λ2, λ4, ... with even-numbered index assigned to it. The outputs of the fabrics SA1 and SA2 are connected to inputs of those among the transponders T1, T2 that have input signal converters CI which provide optical signals having the corresponding carrier wavelengths i.e. the transponder T1 whose input converter CI has the carrier wavelength λ1 is connected to SA1, and the transponder T2 having the carrier wavelength λ2 is connected to SA2.

Analogously, the output signal converters CO of all transponders of a same group are connected to a same output or drop switching fabric SD1, SD2, respectively, and an output of the switching fabric SD1 and the switching fabric SD2 are combined via a monitor MON and a switch SW into a common drop output OD of the node, leading to a receiver.

An information signal to beadded at the add input IA is conveyed via the signal divider DIV to the two add switching fabrics SA1, SA2 and then to two transponders such as transponders T1, T2, belonging to the two different groups. A local control unit CU determines which of the two transponders is to be connected to the input IA by the switching fabrics SA1, SA2. The same control unit CU also determines to which of the output connectors O1, O2, ... the two optical signals (working and protection channels for a given information signal) generated by the corresponding transponders T1, T2 are to be conveyed. The control unit CU may work autonomously, i.e. it makes routing decisions without input from a central network management system, based on routing information contained in the information signals, at which output connector and with which wavelength an incoming information signal is transmitted further. Non-autonomous functioning of the control unit, with the output connector and the output wavelength for an information signal are assigned centrally by the central network management system, will be discussed later on.

The same control unit CU is also used for conveying protection and working channels that arrive at different input connectors I1, I2 and which have identical information content and that are intended for a receiver connected to the drop output OD, to the output signal converters CO of the transponders by correspondingly controlling the switching fabrics S1 to SN, and for combining them via the switching fabrics D1, SD2 onto the monitor MON and the switch SW assigned to said drop output OD. The monitor MON and the switch SW are provided, as described above, for detecting a failure in the transmission of the protection and working channels and to output the failure free one at the drop output OD.

The case of the input signal converters CI being polychromatic is considered in FIG. 5. Here the input signal converters CI of two transponders T1, T2 are connected by a signal divider DIV to a common input connector IA for adding a data traffic signal. A control unit corresponding to the control unit CU mentioned relating to FIG. 4 controls the input signal converter CI in order to define the wavelength of the optical signal generated by it. In order to ensure that the wavelength channel supplied by a transponder can indeed be supplied to the one of the switching fabrics S1 to SN which is assigned to that wavelength, a de-multiplexer DA1, DA2, ... is provided between each input signal converter CI of a transponder and the switching fabrics S1 to SN. Multiplexers MD1, MD2 each connect one of several outputs o'1, ... of the second group of switching fabrics S1 to SN with the output signal converter CO of a transponder T1, T2. The outputs of the output signal converter CO are combined into a common output OD leading to a receiver via a monitor MON and a switch SW, as in case of FIG. 4.

An example for a method for information transmission in a network having nodes that work autonomously and each of which comprises a cross-connect as shown in FIG. 3, or that are designed as shown in FIG. 4 or 5, is described in the following.

A first step of this method is to supply an information signal coming from a transmitter to inputs i'1 of said second group of two of the switching fabrics S1, S2 to SN that have different carrier wavelengths assigned to them.

In the embodiment of FIG. 4, this is achieved by the control unit CU defining for the information signal a path through the switching fabric S1 and the switching fabric S2, respectively, to a transponder for the desired carrier wavelength. The monochromatic transponders are each permanently connected to a respective one of the switching fabrics S1 to SN that processes optical radiation having the carrier wavelength supplied by the transponder.

In the embodiment of FIG. 5, this is achieved by the control unit defining, for each transponder T1, T2, the carrier wavelength on which the transponder is to modulate the information signal coming from the transmitter. According to the defined carrier wavelength, the working and protection channels (i.e. optical carriers with different wavelengths that are modulated with the same information signal) thus obtained are filter transmitted to the corresponding switching fabrics S1 to SN via the de-multiplexers DA1, DA2, respectively. Not all input signal converters CI must here be capable of generating all wavelengths $\lambda 1$ to $\lambda N$ of the multiplex; it is sufficient if among the input signal converters CI of the transponders T1, T2 connected to the common input IA one is capable of generating wavelengths of a first group of the multiplex and the second is capable of generating the wavelengths of a second group, wherein the groups have no wavelengths in common.

In a second step, the protection and working channels are conveyed to different output connectors O1, O2 by the switching fabrics S1 to SN and are thus transmitted to different subsequent nodes of the network.

Each of these nodes comprises a cross-connect having the structure shown in FIG. 3. If at one of the input connectors I1, I2, ... of such a cross-connect there arrives a wavelength channel having the wavelength $\lambda n$, n=1, 2, ..., N, the control unit CU of the cross-connect first determines to which of the output connectors O1, O2, ... the signal is to be conveyed. If the carrier wavelength n is available at this output port, the channel may immediately be forwarded to the output connector, and the processing by the cross-connect is finished.

If the carrier wavelength $\lambda n$ is not available at the desired output connector, the information signal corresponding to the channel is dropped to one of the transponders T1, T2, .... Simultaneously, the control unit CU creates a connection between the output signal converter CO of this transponder and the input signal converter CI of a second transponder which is capable of re-adding the information signal with a modified wavelength $\lambda n'$ which is available at the desired output. The wavelength $\lambda n'$ is selected from the same group to which the wavelength $\lambda n$ belongs. Since the wavelengths of the working and protection channels added to the network at the starting node belong to different groups, it thus ensures that wavelengths of the two channels cannot become identical during the transmission in the network.

Thus the working and protection channels arrive at the target node via different paths and with different carrier wavelengths. Here they have to be dropped in order to be supplied to a receiver connected to a drop output OD of this node. For this purpose, in the case of FIG. 4, the control unit CU of the target node controls the drop switching fabrics SD1, SD2 and drop multiplexers MD1, MD2 connected to a same drop output connector OD so that these let the two channels pass.

Instead of dividing the wavelengths $\lambda 1$ to $\lambda N$ of the multiplex into two groups and permitting wavelength changes of an information signal under transmission at each node of the network transited between start and target nodes only among the wavelengths of its group, it would theoretically also be possible to allow no wavelength changes at all.

Another possibility is to keep the wavelength of only one of either of the working or protection channels fixed and to allow wavelength changes for the other channel to each wavelength except that of the other channel. However, this would require the signalling within the network to distinguish between the two channels and to transmit, together with the channel whose wavelength is permitted to change, control information identifying the wavelength of the fixed wavelength channel.

If the nodes are not autonomous but the network has a centralised network management system which has a global network knowledge (not represented) that determines the route from start to target nodes including the wavelengths to be used between the individual nodes for each transmission connection to be established, the division of the multiplex into the two groups may be abandoned. Since the central network management system knows each node transited by the working and protection channels, it also knows which is the last intermediate node of the working and protection channels, respectively. It is therefore sufficient if it instructs these two nodes to send these channels to the target node with different wavelengths defined by the centralised controller. In this way, on the path of the channels from the start node up to the last intermediate node the wavelength may be selected completely arbitrarily according to availability at the individual nodes.

The invention claimed is:

1. A method of transmitting information from a start node through a plurality of intermediate nodes to a target node in a wavelength division multiplex optical communications network, each node including a wavelength selective optical cross-connect, the method comprising the steps of:
   configuring the cross-connect at each of the start node and the target node with a plurality of switching matrices for switching wavelength channels, the cross-connect at each of the start node and the target node having only a single switching matrix being operative for switching a wavelength channel of each single wavelength, each single wavelength channel being switchable by only the respective said single switching matrix;
   applying two wavelength channels having two wavelengths that are different, but modulated with the same information, to different respective switching matrices of the cross-connect at the start node;
   transmitting the two applied wavelength channels with the different wavelengths via the plurality of nodes passing through different respective switching matrices of the target node;
   extracting the two transmitted wavelength channels from different respective switching matrices of the cross-connect at the target node;

modifying the wavelength of at least one of the two wavelength channels at a cross-connect of one of the intermediate nodes;

dividing the wavelengths transmissible in the optical network into at least two groups; and selecting the wavelengths of the at least two wavelength channels from different ones of the at least two groups, each wavelength modification of one of the two wavelength channels at the cross-connect of the one intermediate node occurring between the wavelengths of a same group.

2. The method according to claim 1, and jointly defining routing paths of the at least two wavelength channels by a central network controller operative for choosing the two different wavelengths for transmission between the cross-connect of a last intermediate node and the cross-connect of the target node.

3. The method according to claim 1, wherein the transmitting step is performed by transmitting the two applied wavelength channels with the different wavelengths via different paths.

4. The method according to claim 1, and routing the at least two wavelength channels via different cross-connects of the intermediate nodes between the cross-connect of the start node and the cross-connect of the target node.

* * * * *

UNITED STATES PATENT AND TRADEMARK OFFICE
CERTIFICATE OF CORRECTION

PATENT NO. : 7,817,918 B2
APPLICATION NO. : 10/521339
DATED : October 19, 2010
INVENTOR(S) : Guild It is certified that error appears in the above-identified patent and that said Letters Patent is hereby corrected as shown below:

On the Title Page, in Item (30), under "Foreign Application Priority Data", in Column 1, Line 1, delete "Jul. 10, 2003" and insert -- Jul. 10, 2002 --, therefor.

In Column 6, Line 24, delete "beadded" and insert -- beaded --, therefor.

In Column 6, Line 51, delete "D1," and insert -- SD1, --, therefor.

In Column 7, Line 33, delete "filter" and insert -- further --, therefor.

In Column 7, Line 53, delete "n" and insert -- $\lambda n$ --, therefor.

Signed and Sealed this
Twelfth Day of April, 2011

David J. Kappos
*Director of the United States Patent and Trademark Office*